United States Patent
Matsudo

(10) Patent No.: US 9,022,645 B2
(45) Date of Patent: May 5, 2015

(54) PLASMA PROCESSING APPARATUS AND TEMPERATURE MEASURING METHOD

(75) Inventor: Tatsuo Matsudo, Nirasaki (JP)

(73) Assignee: Tokyo Electron Limited (JP)

( * ) Notice: Subject to any disclaimer, the term of this patent is extended or adjusted under 35 U.S.C. 154(b) by 537 days.

(21) Appl. No.: 13/428,207

(22) Filed: Mar. 23, 2012

(65) Prior Publication Data

US 2012/0243573 A1 Sep. 27, 2012

Related U.S. Application Data

(60) Provisional application No. 61/472,658, filed on Apr. 7, 2011.

(30) Foreign Application Priority Data

Mar. 23, 2011 (JP) ................................. 2011-064463

(51) Int. Cl.
  *G01J 5/08* (2006.01)
  *G01K 1/02* (2006.01)
  *G01K 5/48* (2006.01)
  *G01K 11/12* (2006.01)

(52) U.S. Cl.
  CPC ................ *G01K 5/48* (2013.01); *G01K 11/125* (2013.01)

(58) Field of Classification Search
  CPC ....... G01K 11/125; G01K 1/143; G01K 1/00; G01K 5/0007; G01J 5/0007; G01J 2005/583; G01J 5/0003; G01J 5/0044; G01J 5/08; G01J 5/0806; G01J 5/0896; G01J 5/0018; G01J 5/0022; G01J 5/041; G01J 5/06; H01L 21/67248; H01L 21/3065; H01L 21/67109; H01L 22/24

USPC ......... 374/121, 120, 130, 131, 132, 161, 141, 374/178, 129, 1; 356/43; 340/870.17; 438/14

See application file for complete search history.

(56) References Cited

U.S. PATENT DOCUMENTS 4,611,919 A * 9/1986 Brooks et al. ................. 356/504
5,364,187 A * 11/1994 Thakur et al. ................. 374/161
6,012,326 A * 1/2000 Raybone et al. ............. 73/31.02

(Continued)

FOREIGN PATENT DOCUMENTS

| JP | 10-019690 | 1/1998 |
| JP | 10062270 | 3/1998 |
| JP | 2006-112826 | 4/2006 |
| JP | 2006220461 | 8/2006 |
| JP | 2010-199526 | 9/2010 |

*Primary Examiner* — Gail Kaplan Verbitsky
(74) *Attorney, Agent, or Firm* — Cantor Colburn LLP

(57) ABSTRACT

A plasma processing apparatus and a temperature measuring method that may measure a temperature of an object in a processing chamber by a low-coherence interferometer without forming a hole in a holding stage or an upper electrode of the plasma processing apparatus, thereby performing a plasma process of a substrate with high precision and uniformity. The plasma processing apparatus is implemented by disposing a light source collimator outside of a light source window, disposing a light-receiving collimator outside of a light-receiving window, allowing a measurement light emitted from the light source collimator to pass through the light source window to be obliquely emitted to a surface of the object to be measured, and allowing the reflected measurement light to pass through the light-receiving window to be incident on the light-receiving collimator. The temperature of the object in the processing chamber may be measured by the low-coherence interferometer.

6 Claims, 16 Drawing Sheets

(56) References Cited

U.S. PATENT DOCUMENTS

| | | | |
|---|---|---|---|
| 6,025,916 A * | 2/2000 | Quick et al. | 356/503 |
| 6,849,470 B1 * | 2/2005 | Eriguchi et al. | 438/14 |
| 2002/0102749 A1 * | 8/2002 | Fielden et al. | 438/14 |
| 2009/0115028 A1 * | 5/2009 | Shimomura et al. | 257/623 |
| 2010/0131226 A1 * | 5/2010 | Takizawa | 702/130 |
| 2012/0247669 A1 * | 10/2012 | Matsudo et al. | 156/345.27 |
| 2014/0056328 A1 * | 2/2014 | Abe et al. | 374/161 |
| 2014/0286375 A1 * | 9/2014 | Abe et al. | 374/129 |

* cited by examiner

PLASMA PROCESSING APPARATUS AND TEMPERATURE MEASURING METHOD

CROSS-REFERENCE TO RELATED PATENT APPLICATIONS

This application claims the benefit of Japanese Patent Application No. 2011-64463, filed on Mar. 23, 2011, in the Japanese Patent Office, and U.S. Patent Application No. 61/472,658, filed on Apr. 7, 2011 in the U.S. Patent and Trademark Office, the disclosure of which are incorporated herein in their entirety by reference.

BACKGROUND OF THE INVENTION

1. Field of the Invention

The present invention relates to a plasma processing apparatus that processes, for example, a semiconductor wafer or a liquid crystal display (LCD) substrate by using plasma, and a temperature measuring method.

2. Description of the Related Art

Accurately measuring a temperature of a substrate, for example, a semiconductor wafer or a liquid crystal display (LCD) substrate, to be processed by using a plasma processing apparatus is very important in order to accurately control shapes, properties, and so on of films or holes formed on or in the semiconductor wafer or the LCD substrate based on the result of various processes such as film formation and etching. Accordingly, a temperature of a semiconductor wafer or a LCD substrate has been measured by using various conventional methods such as a temperature measuring method using a fluorescent thermometer for measuring a temperature of a rear surface of a substrate, a resistance thermometer, or the like.

Recently, a temperature measuring technology using a low-coherence interferometer which can directly measure a temperature of a substrate, which is difficult to do with the conventional temperature measuring methods, has been developed. Also, as the temperature measuring technology using the low-coherence interferometer, a technology has been suggested in which a light from a light source is divided into a measurement light for temperature measurement and a reference light by a first splitter, the measurement light is divided into n measurement lights by a second splitter, the n measurement lights are emitted to n measurement points, and interference between reflected lights of the n measurement lights and a reflected light of the reference light reflected by a reference light reflecting unit is measured to simultaneously measure temperatures of the plurality of measurement points (refer to, for example, Patent Reference 1). According to such a technology, temperatures of a plurality of measurement points may be simultaneously measured with a simple structure. Also, as a temperature measuring technology using the above-described low-coherence interferometer, a technology has been suggested in which a hole through which light passes is formed in a holding stage on which a substrate is mounted, an upper electrode, or the like, and a measurement light is vertically emitted to a surface of an object to be measured through the hole to measure a temperature of the object (refer to, for example, Patent Reference 2).

Also, a technology has been suggested in which a laser light is emitted via a peeping window of a vacuum film-forming apparatus, and a speckle pattern generated due to scattering reflection is received by using an image sensor to measure a temperature of a substrate by using a moving distance of the speckle pattern (refer to, for example, Patent Reference 3). However, this technology is not a temperature measuring technology using a low-coherence interferometer.

As described above, when a temperature of an object to be measured in a processing chamber is measured during a plasma process by using a temperature measuring technology using a low-coherence interferometer, a hole through which light passes is formed in a holding stage on which a substrate is mounted or an upper electrode, and a measurement light is vertically emitted to a surface of the object to be measured to measure the temperature of the object to be measured. However, as such, if the hole is formed in the holding stage or the upper electrode of a plasma processing apparatus, it may negatively affect uniformity of the plasma process.

[Patent Reference 1] Japanese Laid-Open Patent Publication No. 2006-112826

[Patent Reference 2] Japanese Laid-Open Patent Publication No. 2010-199526

[Patent Reference 3] Japanese Laid-Open Patent Publication No. hei 10-19690

SUMMARY OF THE INVENTION

The present invention provides a plasma processing apparatus and a temperature measuring method that may measure a temperature of an object to be measured in a processing chamber by using a low-coherence interferometer without forming a hole in a holding stage or an upper electrode of the plasma processing apparatus, thereby performing a plasma process of a substrate with high precision and uniformity.

According to an aspect of the present invention, a plasma processing apparatus includes: a processing chamber which accommodates a substrate and processes the substrate by using plasma; a holding stage which is provided in the processing chamber and on which the substrate is mounted; an upper electrode which is provided in the processing chamber and faces the holding stage; a focus ring which is provided in the processing chamber to surround the substrate; a light source window and a light-receiving window which are provided at opposing walls of the processing chamber so as to face each other, wherein light passes through the light source window and the light-receiving window; and a temperature measuring unit which comprises a light source, a splitter for dividing light from the light source into a measurement light and a reference light, a reference light reflecting unit for reflecting the reference light from the splitter; a light path length changing unit for changing a light path length of the reference light reflected by the reference light reflecting unit; a light source optical fiber for emitting the measurement light to an object to be measured in the processing chamber, a light source collimator provided at an outlet of the light source optical fiber, a light-receiving optical fiber for receiving the measurement light reflected from the object to be measured, a light-receiving collimator provided at an inlet of the light-receiving optical fiber, and a photodetector for detecting interference between the measurement light reflected from the object to be measured and the reference light reflected by the reference light reflecting unit, wherein the light source collimator is disposed outside of the light source window, and the light-receiving collimator is disposed outside of the light-receiving window, wherein the measurement light emitted from the light source collimator passes through the light source window to be obliquely emitted to a surface of the object to be measured, and the reflected measurement light passes through the light-receiving window and is incident on the light-receiving collimator to measure a temperature of the object to be measured.

According to another aspect of the present invention, a temperature measuring method for measuring a temperature of an object in a processing chamber which accommodates a substrate and processes the substrate by using plasma, the temperature measuring method includes: providing a light source window and a light-receiving window which are provided at opposing walls of the processing chamber so as to face each other, wherein light passes through the light source window and the light-receiving window; disposing a light source collimator outside of the light source window, wherein a temperature measuring unit comprises a light source, a splitter for dividing light from the light source into a measurement light and a reference light, a reference light reflecting unit for reflecting the reference light from the splitter; a light path length changing unit for changing a light path length of the reference light reflected by the reference light reflecting unit; a light source optical fiber for emitting the measurement light to an object to be measured in the processing chamber, the light source collimator provided at an outlet of the light source optical fiber, a light-receiving optical fiber for receiving the measurement light reflected from the object to be measured, a light-receiving collimator provided at an inlet of the light-receiving optical fiber, and a photodetector for detecting interference between the measurement light reflected from the object to be measured and the reference light reflected by the reference light reflecting unit, disposing the light-receiving collimator outside of the light-receiving window; and measuring the temperature of the object by allowing the measurement light emitted from the light source collimator to pass through the light source window to be obliquely emitted to a surface of the object to be measured and allowing the reflected measurement light to pass through the light-receiving window to be incident on the light-receiving collimator.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
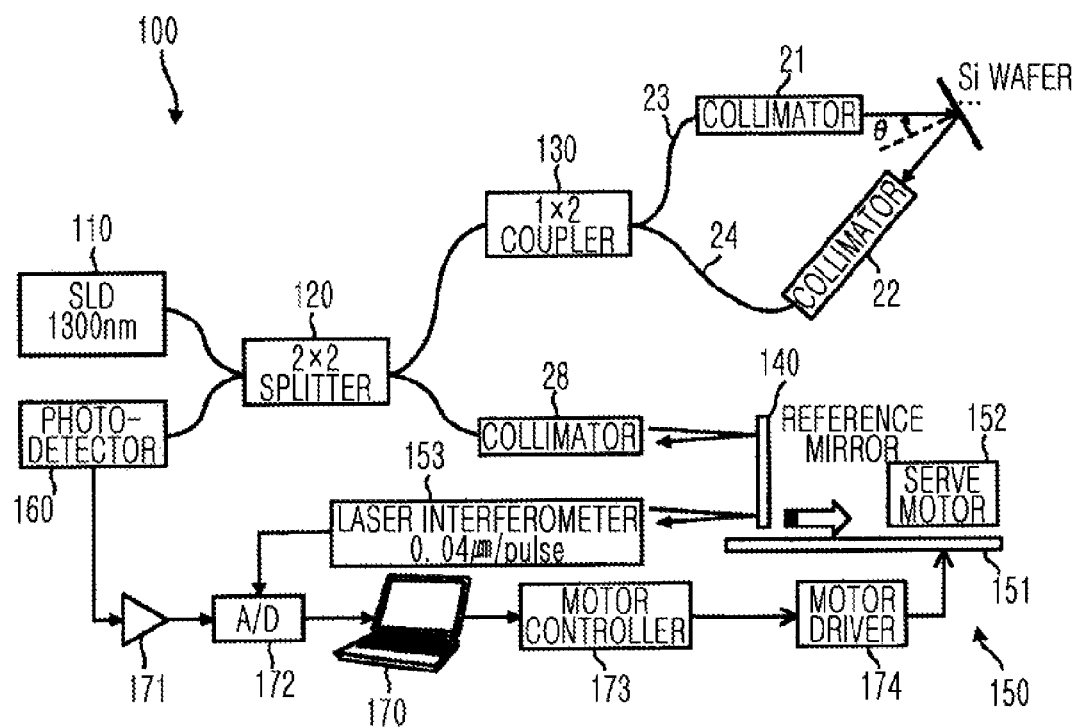
FIG. 1 is a view of a temperature measuring apparatus of a plasma processing apparatus according to an embodiment of the present invention.

The present invention will now be described more fully with reference to the accompanying drawings, in which exemplary embodiments of the invention are shown. Also, in the specification and drawings, components having substantially the same functions are denoted by the same reference numerals, and a repeated explanation thereof will not be given.

Figure 2:
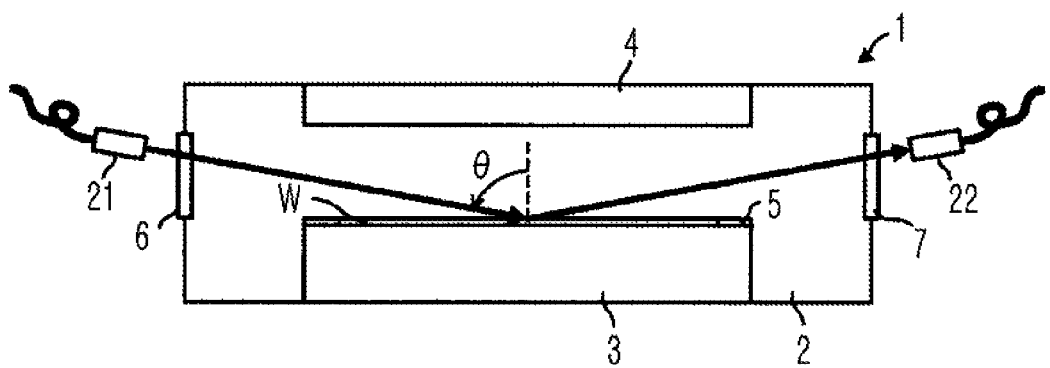
FIG. 2 is a view schematically showing a processing chamber of the plasma processing apparatus according to an embodiment of the present invention.
Figure 3:
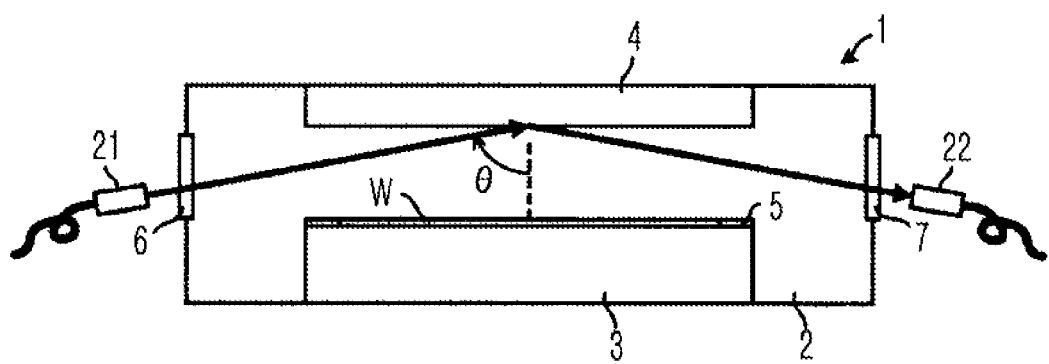
FIG. 3 is a view schematically showing a processing chamber of the plasma processing apparatus according to an embodiment of the present invention.

FIG. 1 is a view of a temperature measuring apparatus 100 of a plasma processing apparatus 1 according to an embodiment of the present invention. FIGS. 2 and 3 are views schematically showing a processing chamber 2 of the plasma processing apparatus 1.

As shown in FIGS. 2 and 3, a holding stage 3 on which a semiconductor wafer W is mounted is disposed in the processing chamber 2. An electrostatic chuck (not shown) for adsorbing the semiconductor wafer W is provided in on the surface of the holding stage 3. Also, an upper electrode 4 is disposed over the holding stage 3 to face the holding stage 3, and a pair of opposing electrodes is composed of the holding stage 3 which serves as a lower electrode and the upper electrode 4. A high-frequency power supply (not shown) is connected to any one of the holding stage 3 and the upper electrode 4, e.g., the holding stage 3, and plasma of a processing gas is generated in a space between the holding stage 3 and the upper electrode 4 by high-frequency power applied from the high-frequency power supply. A focus ring 5 formed of, e.g., silicon, is disposed on the surface of the holding stage 3 to surround the semiconductor wafer W.

A light source window 6 (that is a window on a light source side) and a light-receiving window 7 (that is a window on a light-receiving side) are provided at opposing walls of the processing chamber 2 so as to face each other. A light source collimator 21 (that is a collimator on a light source side) of the temperature measuring apparatus 100 shown in FIG. 1 is disposed outside of the light source window 6. Also, a light-receiving collimator 22 (that is a collimator on a light-receiving side) of the temperature measuring apparatus 100 is disposed outside of the light-receiving window 7. A measurement light is obliquely emitted to surfaces of objects to be measured, e.g., the semiconductor wafer W, the upper electrode 4, and the focus ring 5, from the light source collimator 21, and the light-receiving collimator 22 receives a reflected light of the measurement light. FIG. 2 shows when a measurement light is obliquely emitted to the semiconductor wafer W to measure a temperature of the semiconductor wafer W, and FIG. 3 shows when a measurement light is obliquely emitted to the upper electrode 4 to measure a temperature of the upper electrode 4.

As shown in FIG. 1, the temperature measuring apparatus 100 includes a light source 110 for generating a measurement light used for temperature measurement, a splitter 120 for dividing light from the light source 110 into a measurement light for temperature measurement and a reference light, a coupler 130 for deriving the measurement light from the splitter 120 and introducing a reflected light of the measurement light, a reference light reflecting unit 140 for reflecting the reference light from the splitter 120, a light path length changing unit 150 for changing a light path length of the reference light reflected by the reference light reflecting unit 140, and a photodetector 160 for detecting reflected lights of the measurement light and the reference light to measure interference between the reflected lights.

The light path length changing unit 150 includes a linear stage 151 for moving the reference light reflecting unit 140 formed of, e.g., a reference mirror, in a direction parallel to an incident direction of the reference light, a servo motor 152, a laser interferometer 153 for detecting a position of the reference light reflecting unit 140, and the like. As such, by driving the reference light reflecting unit 140 such as a reference mirror in one direction, a light path length of the reference light reflected by the reference light reflecting unit 140 may be changed. The servo motor 152 is controlled by a controller 170, such as a computer, via a motor controller 173 and a motor driver 174. Furthermore, a signal applied from the laser interferometer 153 is converted into a digital signal by an analog/digital (A/D) converter 172 and input into the controller 170.

An arbitrary light capable of measuring interference between the measurement light and the reference light may be used as the light source 110. When a temperature of the semiconductor wafer W is to be measured, light in which reflected light from a distance (generally, from about 800 to about 1500 μm) between a front surface and a rear surface of the semiconductor wafer W does not cause interference may be used. Specifically, for example, a low-coherence light may be used. The low-coherence light refers to light having a short coherence length. A central wavelength of the low-coherence light may be in a range between about 0.3 and about 20 μm, and more preferably, between about 0.5 and about 5 μm. The coherence length may be in a range between about 0.1 and about 100 μm, and more preferably, equal to or less than 3 μm. By using the low-coherence light as the light source 110, an obstacle due to unnecessary interference may be avoided, and thus, interference between the low-coherence light and the reference light based on reflected light from the front surface or an inner layer of the semiconductor wafer W may be easily measured.

As the light source 110 using the low-coherence light, for example, a super luminescent diode (SLD), a light-emitting diode (LED), a high-intensity lamp (a tungsten lamp, a xenon lamp, etc.), an ultra-wideband wavelength light source, or the like may be used. From among the low-coherence light sources, the high-intensity SLD (having a wavelength of, e.g., 1300 nm) shown in FIG. 1 may be used as the light source 110.

An optical fiber coupler may be used as the splitter 120. However, the present invention is not limited thereto, and any of various other splitters may be used. Also, although, for example, an optical fiber coupler may be used as the coupler 130, the present invention is not limited thereto, and any of various other couplers may be used.

The reference light reflecting unit 140 may be formed of, for example, a reference mirror. Examples of the reference mirror may include a corner cube prism, a plane mirror, and the like. From among theses, in terms of parallelism between a reflected light and an incident light, the corner cube prism may be used as the reference mirror. However, the present invention is not limited thereto, and reference light reflecting unit 140 may be formed of, for example, a delay line capable of reflecting a reference light.

The photodetector 160 may be formed of, for example, a photodiode in consideration of its low cost and compact size. Specifically, the photodetector 160 may be formed of a photo detector (PD) using, for example, a Si photodiode, an InGaAs photodiode, a Ge photodiode, or the like. However, if interference between the measurement light from the object to be measured and the reference light from the reference light reflecting unit 140 may be measured, the present invention is not limited to the above-described photodiodes, and the photodetector 160 may be formed of, for example, an avalanche photodiode, a photomultiplier, or the like. A signal detected by the photodetector 160 is input into the A/D converter 172 via an amplifier 171, converted into a digital signal, and processed by the controller 170.

The reference light from the splitter 120 is transmitted to a reference light emission position of the reference light reflecting unit 140 via an optical fiber and a collimator 28. Also, the measurement light from the splitter 120 is transmitted to a measurement light emission position of the object to be measured disposed outside of the light source window 6 (see FIGS. 2 and 3) via the coupler 130, the optical fiber 23, and the light source collimator 21. As shown in FIGS. 2 and 3, the measurement light is obliquely emitted to the surfaces of the object to be measured, for example, the semiconductor wafer W, the upper electrode 4, and the focus ring 5 from the outside of the light source window 6.

The reflected light of the measurement light from the object to be measured is received by the light-receiving collimator 22 disposed outside of the light-receiving window 7 and incident on the photodetector 160 via the optical fiber 24, the coupler 130, and the splitter 120. The reflected light of the reference light reflected by the reference light reflecting unit 140 is received by the collimator 28 and incident on the photodetector 160 via the splitter 120. The photodetector 160 detects an interference wave between the reflected light of the measurement light and the reflected light of the reference light and detects a temperature of the object to be measured by using the interference wave.

As such, in the current embodiment, the measurement light is obliquely emitted to the semiconductor wafer W, the upper electrode 4, the focus ring 5, etc. which are objects to be measured from the outside of the processing chamber 2 by using the light source window 6 and the light-receiving window 7, and the measurement light is received to measure the temperatures of the objects to be measured. Accordingly, unlike a conventional temperature measuring technology using a low-coherence interferometer, in the present invention, there is no need to dispose an optical introducing unit, which vertically emits a measurement light to the object to be measured, for example, the semiconductor wafer W, the upper electrode 4, the focus ring 5, etc., in the holding stage 3 or the upper electrode 4, thereby preventing uniformity of the processing of the semiconductor wafer W from being decreased.

Figure 4:
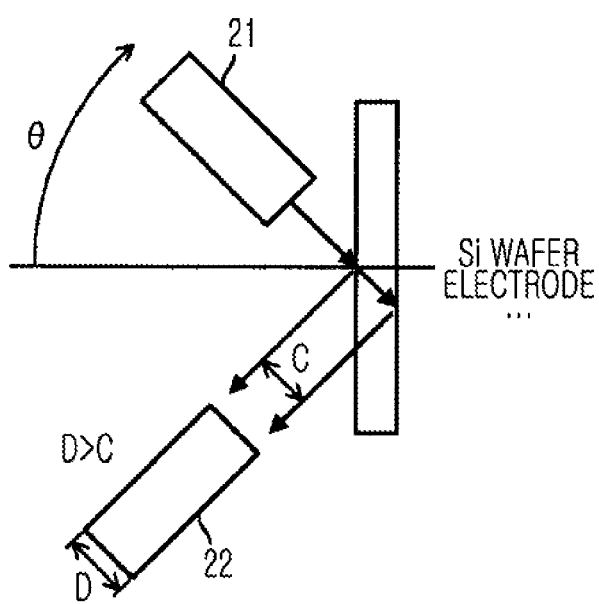
FIG. 4 is a view showing a state in which a measurement light is reflected.

In the plasma processing apparatus 1 having the above-described structure, as shown in FIG. 4, the measurement light for temperature measurement emitted to the object to be measured, e.g., the semiconductor wafer W, is reflected by the surface of the semiconductor wafer W and is also reflected from a rear side of the semiconductor wafer W, and thus the interference wave between the reflected light of the measurement light and the reference light is detected.

As described above, when the measurement light is obliquely emitted to the object to be measured at an incident angle θ to detect the reflected light of the measurement light, a light path of the measurement light reflected by the surface of the object is misaligned by a distance "c" from a light path of the measurement light reflected from the rear side of the object as shown in FIG. 4. Accordingly, the light-receiving collimator 22 requires a diameter D capable of detecting the measurement lights that are misaligned from each other by the distance "c".

Figure 5:
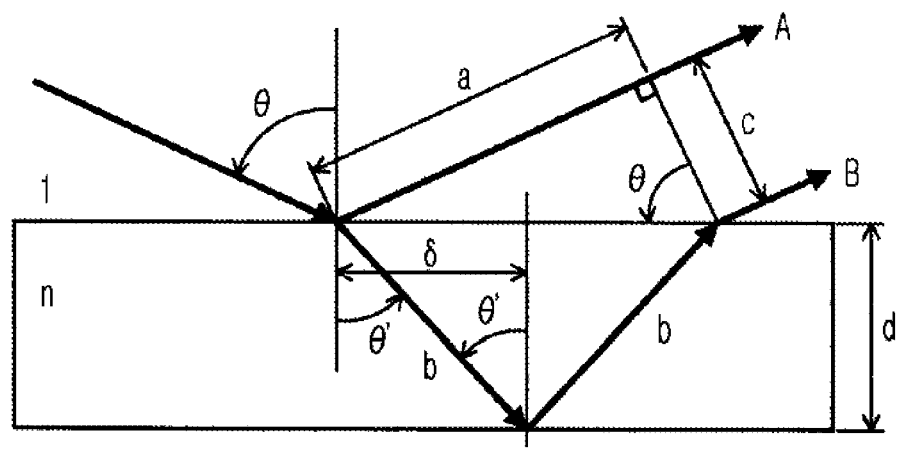
FIG. 5 is a view showing a state in which a measurement light is reflected.

Also, as shown in FIG. 5, when a thickness of the object to be measured is "d" and a refractive index of the object to be measured is "n", a light path length difference Δ between a reflected light A reflected by the surface of the object and a reflected light B reflected from the rear side of the object satisfies the following equation, $$\Delta = 2nb - a.$$

Here, $a = (2d \sin^2\theta)/(n^2 - \sin^2\theta)^{1/2}$, and $b = nd/(n^2 - \sin^2\theta)^{1/2}$. Accordingly, the light path length difference Δ satisfies the following equation, $$\Delta = 2nb - a = 2d/(n^2 - \sin^2\theta)^{1/2}.$$

Figure 6:
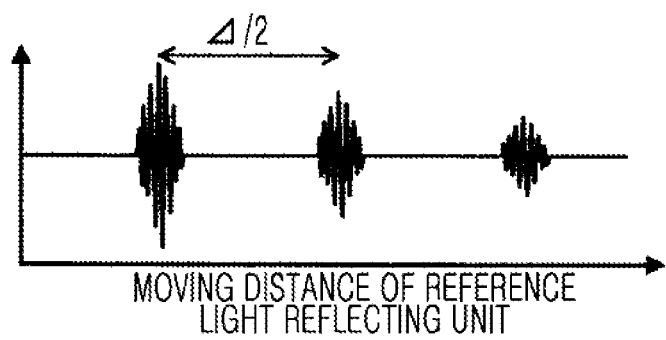
FIG. 6 is a graph showing an example of an interference waveform.

Also, in the case of a vertical incident method, since θ is 0, the light path length difference Δ satisfies the following equation, $\Delta = 2nd$. Accordingly, when the reference light reflecting unit 140 for reflecting the reference light is moved by a moving distance Δ/2, an interference waveform is generated as shown in the graph of FIG. 6.

The beam misalignment "c" between the reflected right A reflected by the surface of the object and a reflected light B reflected from the rear side of the object satisfies the following equation, $$c = (2d \sin\theta \cdot \cos\theta)/(n^2 - \sin^2\theta)^{1/2}.$$

Here, if θ is 0, the beam misalignment "c" is 0, and thus the reflected right A reflected by the surface of the object and a reflected light B reflected from the rear side of the object overlap with each other.

Figure 7:
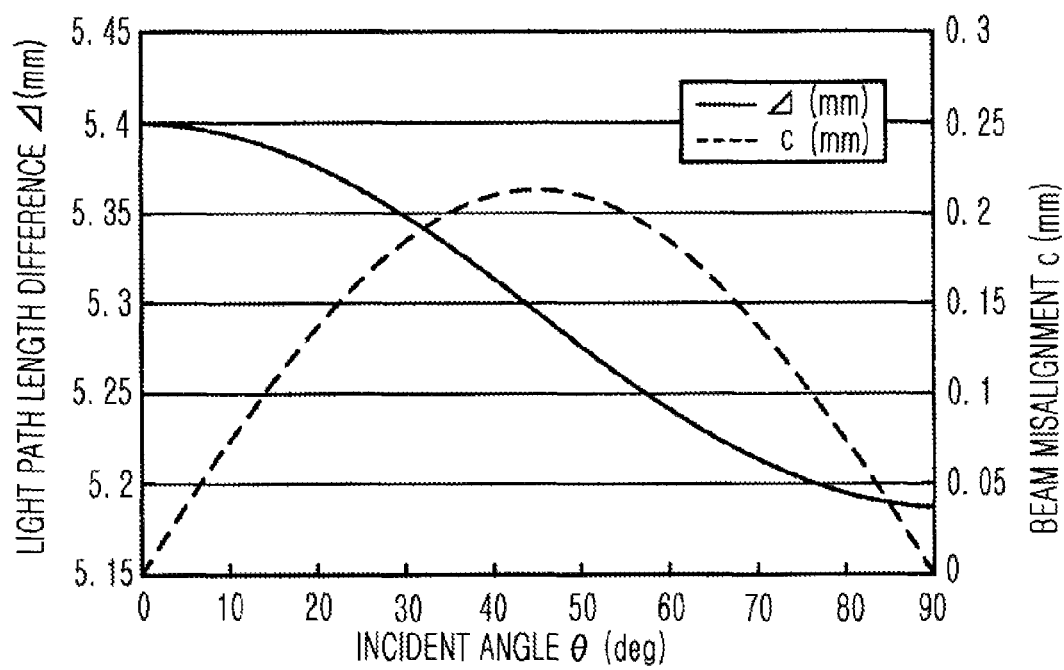
FIG. 7 is a graph showing relations between a light path length difference and an incident angle and between a beam misalignment and the incident angle.
Figure 8:
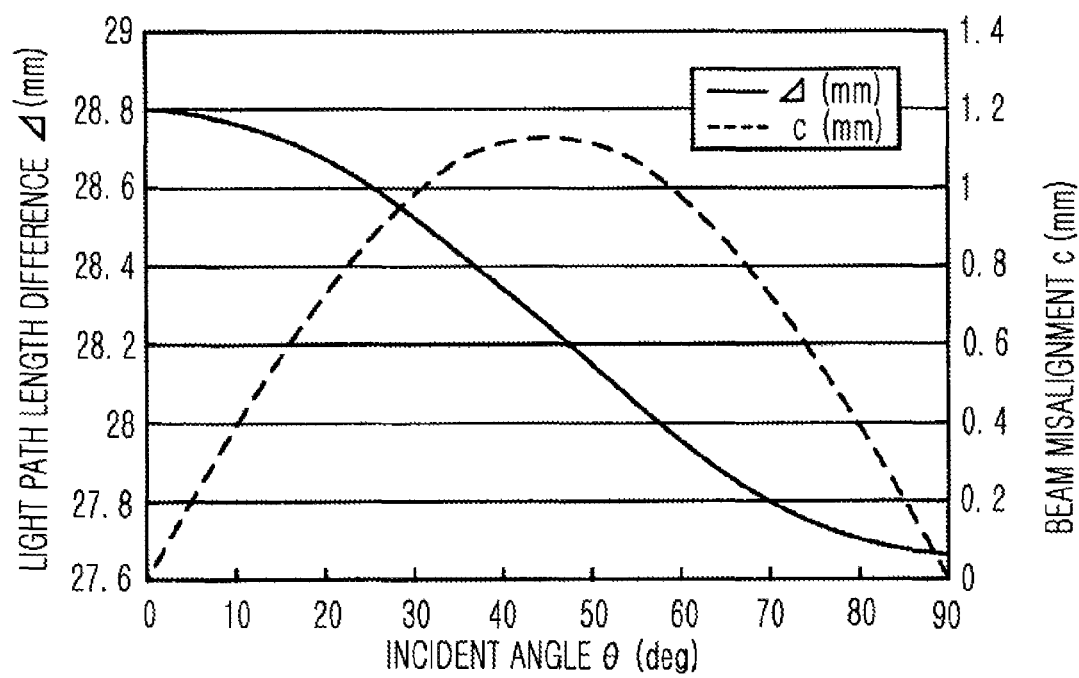
FIG. 8 is a graph showing relations between a light path length difference and an incident angle and between a beam misalignment and the incident angle.
Figure 9:
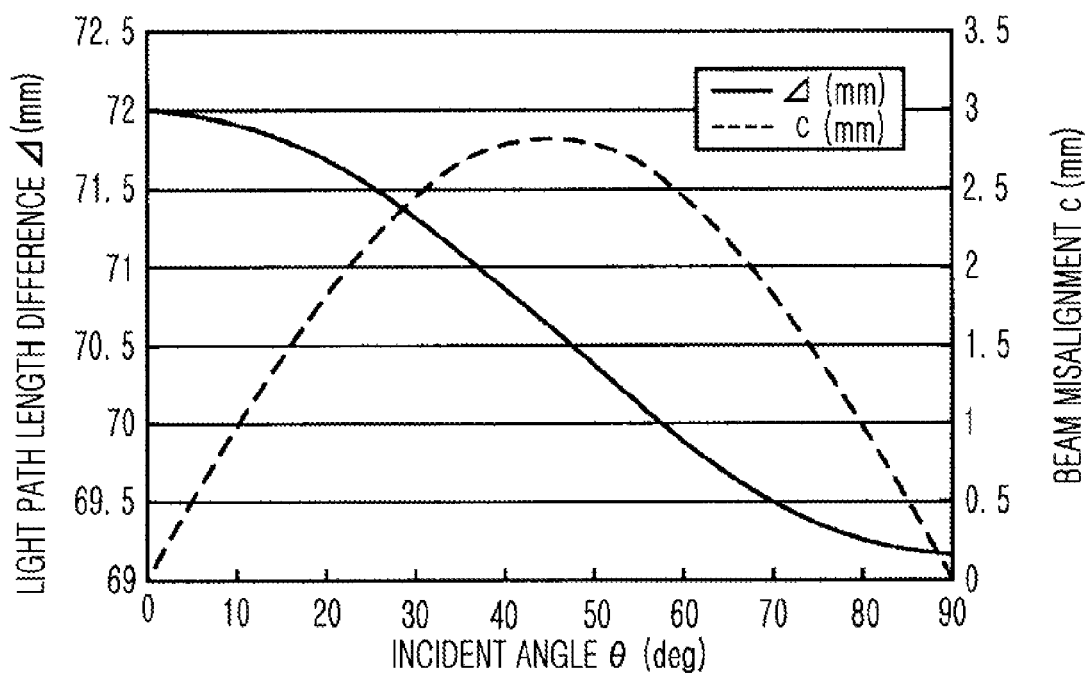
FIG. 9 is a graph showing relations between a light path length difference and an incident angle and between a beam misalignment and the incident angle.

FIGS. 7 to 9 are graphs showing a relation between a light path length difference Δ (mm), a beam misalignment c (mm), and an incident angle θ (deg), wherein vertical axes are the light path length difference Δ (mm) and the beam misalignment c (mm) and a horizontal axis is the incident angle θ (deg). FIG. 7 shows a case when n is 3.6 and d is 750 μm (for example, a Si wafer). FIG. 8 shows a case when n is 3.6 and d is 4 mm (for example, a Si focus ring). FIG. 9 shows a case when n is 3.6 and d is 10 mm (for example, a Si upper electrode).

Meanwhile, a variation in a refractive index of Si is represented by the following equation.

$$N(\lambda) = [3.35 + (0.22/\lambda^2)] + [6.05/\lambda^{1/2} - 1.64] \times 10^{-4} T$$

Figure 10:
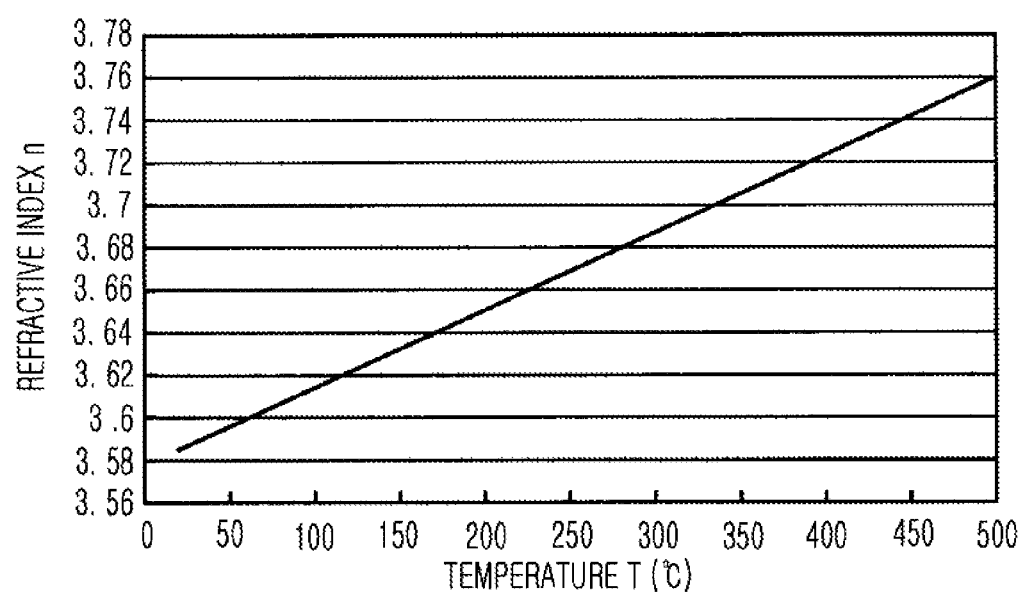
FIG. 10 is a graph showing a relation between a refractive index of silicon and a temperature.

From the above equation, temperature dependence of a refractive index with respect to light having a wavelength of 1.31 μm from a light source is shown in the graph of FIG. 10, wherein a vertical axis is the refractive index and a horizontal axis is a temperature. As shown in the graph of FIG. 10, the refractive index is increased by 5% in a temperature range between a room temperature and 500° C.

Figure 11:
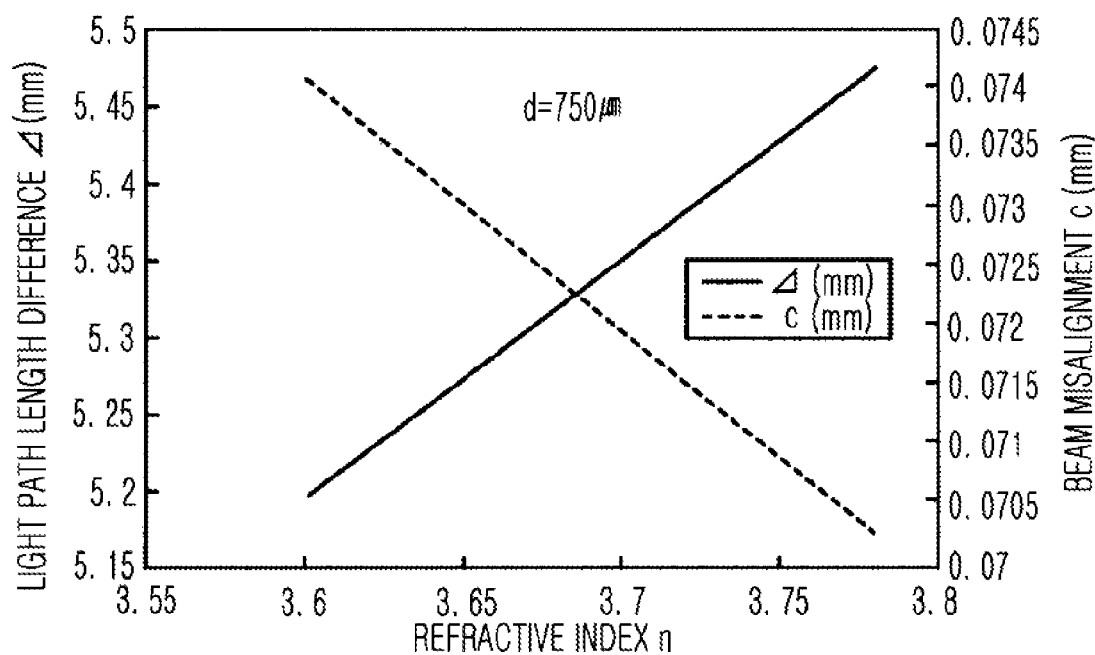
FIG. 11 is a graph showing relations between a light path length difference and a refractive index and between a beam misalignment and the refractive index.
Figure 12:
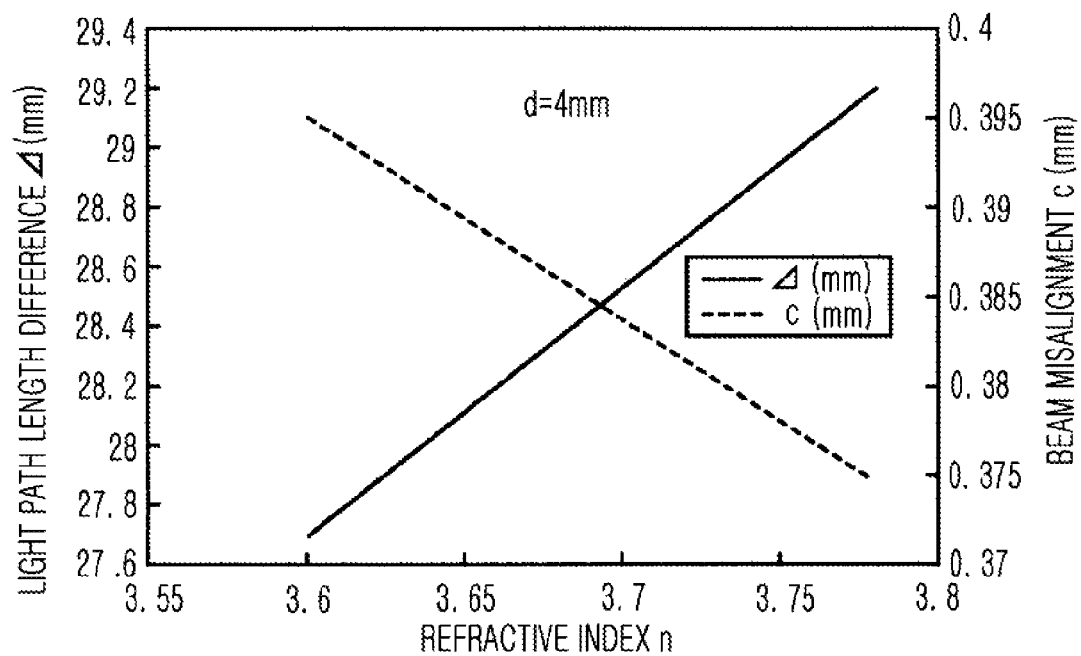
FIG. 12 is a graph showing relations between a light path length difference and a refractive index and between a beam misalignment and the refractive index.
Figure 13:
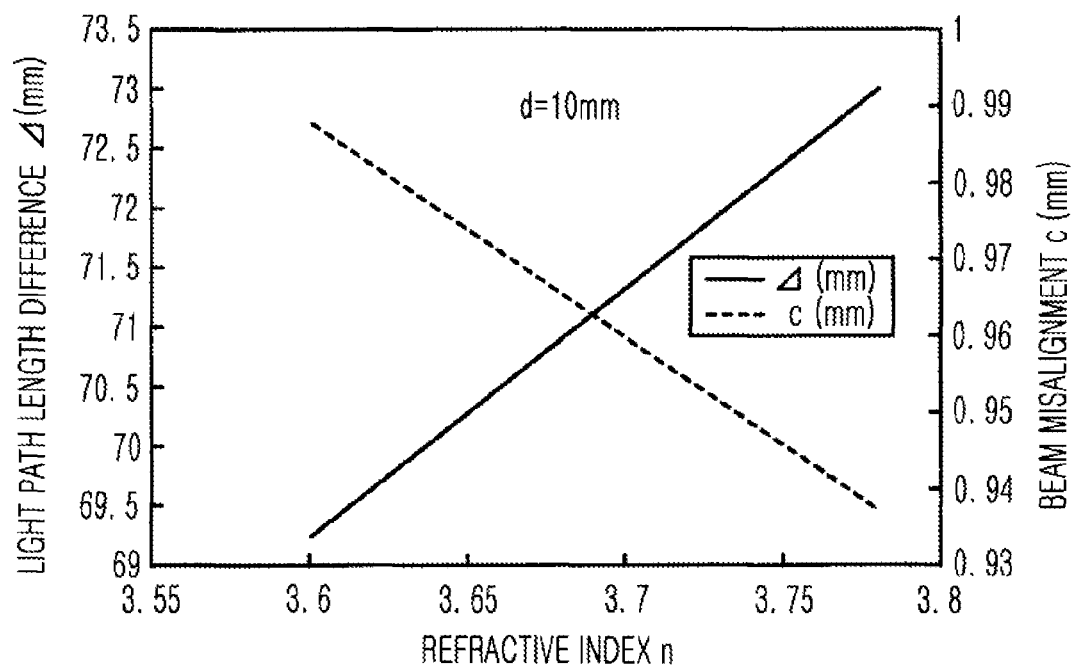
FIG. 13 is a graph showing relations between a light path length difference and a refractive index and between a beam misalignment and the refractive index.

Variations in the light path length difference Δ and the beam misalignment c while the refractive index is increased by 5% are shown in the graphs of FIGS. 11 to 13, wherein vertical axes are the light path length difference Δ and beam misalignment c, and a horizontal axis is the refractive index n. FIG. 11 shows a case when d is 750 μm, FIG. 12 shows a case when d is 4 mm, and FIG. 13 shows a case when d is 10 mm.

As shown in FIGS. 11 to 13, the light path length difference Δ is increased and the beam misalignment c is decreased due to the increase in the refractive index n. Accordingly, the diameter D of the light-receiving collimator 22 may be determined by using the value of the beam misalignment c as the lowest temperature during the temperature measurement.

Figure 14:
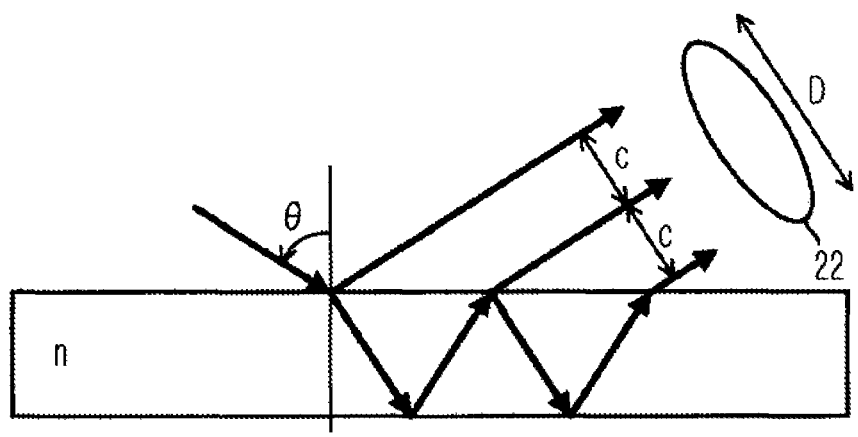
FIG. 14 is a view showing a state in which a measurement light is reflected.

As shown in FIG. 14, when the measurement light is obliquely emitted to the object to be measured, the measurement light that is incident on an incident surface of the object and is reflected at a rear side of the object has a component of light that is reflected at an inner side of the incident surface of the object and then is reflected at the rear side of the object and is derived from the incident surface of the object. In this case, a beam misalignment between the measurement light, which is reflected outside of the incident surface of the object, and the light, which is reflected inside of the object three times and then is derived, is "2c". In order for the light-receiving collimator 22 to receive the measurement light, the light-receiving collimator 22 requires the diameter D of 2c or more.

When the object to be measured is the semiconductor wafer W, if n is 3.6 and a thickness is 750 μm, a maximum value of c is 0.25 mm, and if a beam diameter of a measurement light is 1 mm, the light-receiving collimator 22 has a diameter D equal to or greater than 1.25 mm. Also, if a beam misalignment is 2c, the light-receiving collimator 22 has the diameter D equal to or greater than 1.50 mm.

When the object to be measured is a focus ring, if n is 3.6 and a thickness is 4 mm, a maximum value of c is 1.2 mm, and if a beam diameter of a measurement light is 1 mm, the light-receiving collimator 22 has a diameter D equal to or greater than 2.2 mm. Also, if a beam misalignment is 2c, the light-receiving collimator 22 has the diameter D equal to or greater than 3.4 mm.

When the object to be measured is an upper electrode, if n is 3.6 and a thickness is 10 mm, a maximum value of c is 3 mm, and if a beam diameter of a measurement light is 1 mm, the light-receiving collimator 22 has a diameter D equal to or greater than 4 mm. Also, if a beam misalignment is 2c, the light-receiving collimator 22 has the diameter D equal to or greater than 7 mm. A collimator that is currently selling on the market may be used as the light-receiving collimator 22 having such a diameter.

When a temperature of the semiconductor wafer W or the like is to be measured by using the temperature measuring apparatus 100, an initial thickness of the semiconductor wafer W or the like, which is an object to be measured, is measured before the temperature measurement. At this time, the waveforms shown in FIG. 6 are obtained, and the initial thickness of the semiconductor wafer W or the like is obtained as an interval between the peaks of the waveforms shown in FIG. 6. The temperature of the semiconductor wafer W or the like is detected by a variation in a thickness with respect to the initial thickness of the semiconductor wafer W or the like, that is, a variation in the interval between the peaks of the waveforms shown in FIG. 6.

Here, the above-described low-coherence light source is used as the light source 110. According to the low-coherence light source, since a coherence length of light from the light source 110 is short, a strong interference generally occurs in a place where an light path length of a measurement light accords with an light path length of a reference light, and interference is substantially decreased in places other than the place. Accordingly, by moving the reference light reflecting unit 140 to change the light path length of the reference light, the reference light and the measurement light reflected due to a difference in refractive index between the front surfaces, the rear surfaces, and each inner layer (if the inner layers are formed inside the objects to be measured) of the objects to be measured interfere with each other.

Figure 15:
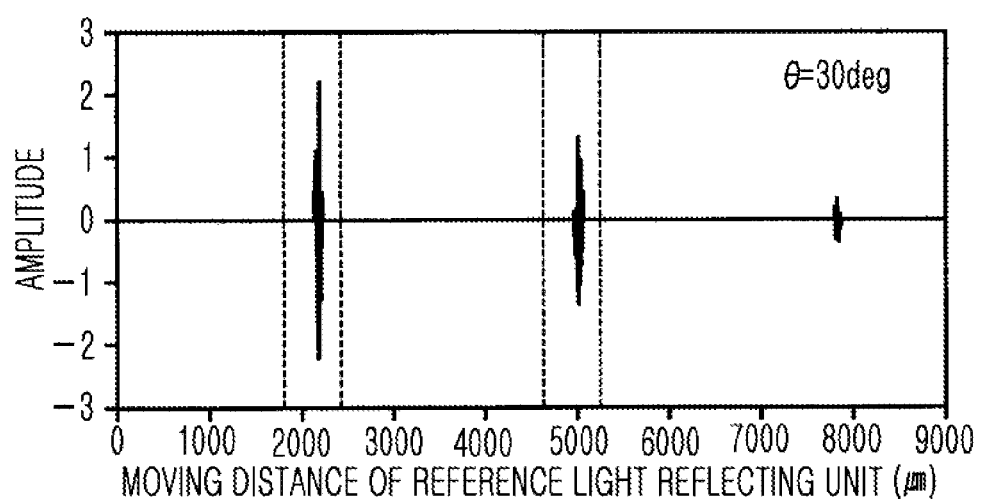
FIG. 15 is a graph showing an example of an interference waveform.
Figure 16:
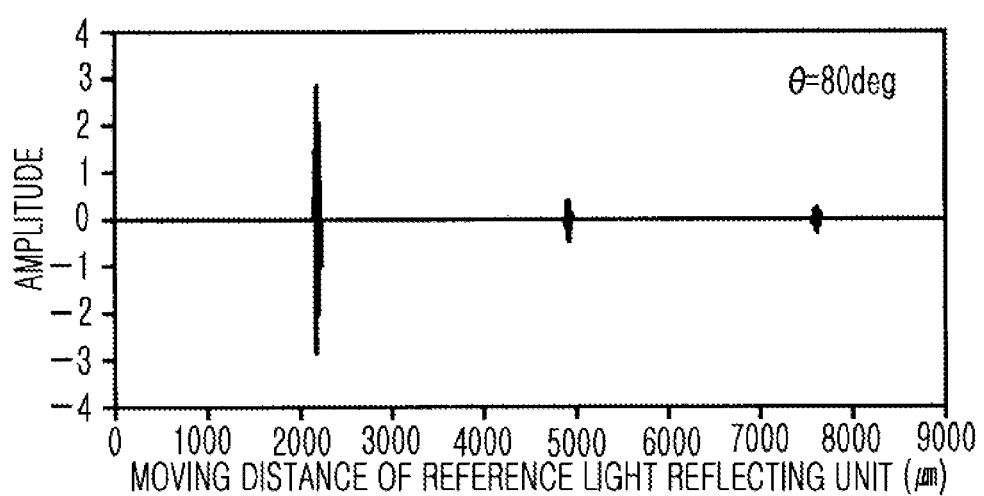
FIG. 16 is a graph showing an example of an interference waveform.

FIGS. 15 and 16 are graphs showing signals when interference waves are actually detected by obliquely emitting a measurement light to an object to be measured, wherein a vertical axis is an amplitude and a horizontal axis is a moving distance of a reference light reflecting unit. FIG. 15 shows a case when θ is 30° and FIG. 16 shows a case when θ is 80°.

In the actual temperature measurement, when the light source collimator 21 and the light-receiving collimator 22 of the temperature measuring apparatus 100 are respectively disposed outside of the light source window 6 and the light-receiving window 7 of the plasma processing apparatus 1, an incident angle θ of the measurement light with respect to the object to be measured is determined, and thus temperature correction data of a light path length of the object with respect to the incident angle θ is previously obtained after the light source collimator 21 and the light-receiving collimator 22 are disposed, and then is stored in database. Then, a temperature of the object to be measured is calculated by using the light path length of the object, such as the semiconductor wafer W, the upper electrode 4, the focus ring 5, etc., on the basis of the database.

According to the present invention, a plasma processing apparatus and a temperature measuring method may measure a temperature of an object to be measured in a processing chamber by using a low-coherence interferometer without forming a hole in a holding stage or an upper electrode of the plasma processing apparatus, thereby performing a plasma process of a substrate with high precision and uniformity.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A plasma processing apparatus comprising:
   a processing chamber which accommodates a substrate and processes the substrate by using plasma;
   a holding stage which is provided in the processing chamber and on which the substrate is mounted;
   an upper electrode which is provided in the processing chamber and faces the holding stage;
   a focus ring which is provided in the processing chamber to surround the substrate;
   a pair of a light source window and a light-receiving window which are provided at opposing walls of the processing chamber so as to face each other, wherein light passes through the light source window and the light-receiving window from or to the process chamber; and
   a temperature measuring unit which includes a light source, a splitter for dividing light from the light source into a measurement light and a reference light, a reference light reflecting unit for reflecting the reference light from the splitter; a light path length changing unit for changing a light path length of the reference light reflected by the reference light reflecting unit; a light source optical fiber for emitting the measurement light to an object to be measured in the processing chamber, a light source collimator provided at an outlet of the light source optical fiber, a light-receiving optical fiber for receiving the measurement light reflected from the object to be measured, a light-receiving collimator provided at an inlet of the light-receiving optical fiber, and a photodetector for detecting interference between the measurement light reflected from the object to be measured and the reference light reflected by the reference light reflecting unit,
   wherein the light source collimator is disposed outside of the light source window, and the light-receiving collimator is disposed outside of the light-receiving window, wherein the measurement light emitted from the light source collimator passes through the light source window to be obliquely emitted to a surface of the object to be measured, and the reflected measurement light passes through the light-receiving window and is incident on the light-receiving collimator to measure a temperature of the object to be measured.

2. The plasma processing apparatus of claim 1, wherein the object to be measured is any one of the substrate, the upper electrode, and the focus ring.

3. The plasma processing apparatus of claim 1, wherein the measurement light is previously emitted to the object in the processing chamber to detect the reflected measurement light and obtain temperature correction data of a light path length, wherein the temperature correction data is stored in a database, and the temperature of the object to be measured is calculated based on the temperature correction data stored in the database.

4. A temperature measuring method for measuring a temperature of an object in a processing chamber which accommodates a substrate and processes the substrate by using plasma, the temperature measuring method comprising:
   providing a pair of a light source window and a light-receiving window which are provided at opposing walls of the processing chamber so as to face each other, wherein light passes through the light source window and the light-receiving window;
   disposing a light source collimator of a temperature measuring unit outside of the light source window, wherein the temperature measuring unit includes a light source, a splitter for dividing light from the light source into a measurement light and a reference light, a reference light reflecting unit for reflecting the reference light from the splitter; a light path length changing unit for changing a light path length of the reference light reflected by the reference light reflecting unit; a light source optical fiber for emitting the measurement light to an object to be measured in the processing chamber, the light source collimator provided at an outlet of the light source optical fiber, a light-receiving optical fiber for receiving the measurement light reflected from the object to be measured, a light-receiving collimator provided at an inlet of the light-receiving optical fiber, and a photodetector for detecting interference between the measurement light reflected from the object to be measured and the reference light reflected by the reference light reflecting unit,
   disposing the light-receiving collimator outside of the light-receiving window; and
   measuring the temperature of the object by allowing the measurement light emitted from the light source collimator to pass through the light source window to be obliquely emitted to a surface of the object to be measured and allowing the reflected measurement light to pass through the light-receiving window to be incident on the light-receiving collimator.

5. The temperature measuring method of claim 4, wherein the object to be measured is any one of the substrate, an upper electrode which is provided in the processing chamber and faces a holding stage on which the substrate is mounted, and a focus ring which is provided in the processing chamber to surround the substrate.

6. The temperature measuring method of claim 4, wherein the measurement light is previously emitted to the object in the processing chamber to detect the reflected measurement light and obtain temperature correction data of a light path length, wherein the temperature correction data is stored in a database, and the temperature of the object to be measured is calculated based on the temperature correction data stored in the database.

\* \* \* \* \*